(12) United States Patent
McCormick et al.

(10) Patent No.: US 9,649,895 B2
(45) Date of Patent: May 16, 2017

(54) METHOD OF DETECTING A VEHICLE TIRE THEFT

(75) Inventors: Catherine L. McCormick, New Boston, MI (US); Steven Swanson, Commerce Township, MI (US)

(73) Assignee: General Motors LLC, Detroit, MI (US)

(*) Notice: Subject to any disclaimer, the term of this patent is extended or adjusted under 35 U.S.C. 154(b) by 1062 days.

(21) Appl. No.: 12/954,322

(22) Filed: Nov. 24, 2010

(65) Prior Publication Data

US 2012/0126967 A1    May 24, 2012

(51) Int. Cl.
*B60C 23/02* (2006.01)
*B60C 23/04* (2006.01)

(52) U.S. Cl.
CPC .................. *B60C 23/0408* (2013.01)

(58) Field of Classification Search
USPC ........... 340/442–448, 426.1, 426.16, 426.18, 340/426.22, 426.26, 426.33
See application file for complete search history.

(56) References Cited

U.S. PATENT DOCUMENTS

| | | | |
|---|---|---|---|
| 5,717,376 A * | 2/1998 | Wilson | 340/442 |
| 5,963,128 A * | 10/1999 | McClelland | 340/447 |
| 6,034,596 A * | 3/2000 | Smith et al. | 340/447 |
| 6,445,287 B1 * | 9/2002 | Schofield et al. | 340/442 |
| 6,696,935 B2 * | 2/2004 | Bonardi et al. | 340/447 |
| 6,879,247 B2 * | 4/2005 | Shimomura et al. | 340/426.18 |
| 6,960,990 B2 * | 11/2005 | McKibbon | 340/426.35 |
| 7,202,777 B2 * | 4/2007 | Tsuji et al. | 340/447 |
| 7,404,317 B2 * | 7/2008 | Mancosu et al. | 73/146 |
| 7,408,464 B2 * | 8/2008 | Brodine | G06Q 30/02 307/10.2 |
| 7,515,040 B2 * | 4/2009 | Mori et al. | 340/442 |
| 7,599,769 B2 * | 10/2009 | Nou | 701/32.4 |
| 7,688,184 B2 * | 3/2010 | Shimomura et al. | 340/426.33 |
| 8,150,563 B2 * | 4/2012 | Georgi et al. | 701/2 |
| 8,198,991 B2 * | 6/2012 | Do | 340/426.1 |
| 2003/0048178 A1 * | 3/2003 | Bonardi | B60C 23/0416 340/442 |

* cited by examiner

*Primary Examiner* — Hai Phan
*Assistant Examiner* — Son M Tang
(74) *Attorney, Agent, or Firm* — Christopher DeVries; Reising Ethington P.C.

(57) ABSTRACT

A system and method for detecting a missing vehicle tire and notifying a user of the vehicle about a potential vehicle tire theft. The method carried out by the system involves detecting that a tire is missing from a vehicle using a vehicle tire pressure monitoring (TPM) system and thereafter providing a notification of the missing tire via a wireless communication sent from a telematics unit on the vehicle. The wireless communication can be sent automatically by the telematics unit in response to the detection. Identification numbers or other data reported by sensors used in the TPM system can be used to determine if a tire is missing.

16 Claims, 3 Drawing Sheets

METHOD OF DETECTING A VEHICLE TIRE THEFT

TECHNICAL FIELD

The present invention relates generally to security and monitoring systems for vehicles.

BACKGROUND OF THE INVENTION

Vehicle tire theft is an ongoing problem for vehicle owners. Specialized locking or anti-theft lug nuts can be used that require a proper socket key to remove the lug nut, thereby making theft difficult. But these mechanical protections are not always used and can be defeated. Vehicle security systems are known and commonly used to detect and announce unauthorized access to the vehicle. For example, vehicle alarm systems that can be armed and disarmed using a keyfob or other portable transmitter are in wide use today and are used by the vehicle operator to help prevent access to and theft of items from the vehicle as well as theft of the vehicle itself. Some such systems can help prevent wheel theft by sensing movement of the vehicle and sounding an audible alarm that attracts attention and deters the would-be thief. However, even those that detect movement of the vehicle are not specifically designed or implemented to detect theft of the vehicle wheels or tires themselves.

In an unrelated field of automotive engineering, many vehicle models today employ tire pressure monitoring (TPM) systems to monitor and alert a driver when a tire pressure falls below a certain level. The TPM system may employ pressure sensors having unique identification numbers and mounted at each wheel of a vehicle. Then, the vehicle is programmed with the location of each sensor so the vehicle will know exactly which tire if any whose pressure falls below a certain level. In case of a tire rotation, the vehicle is reprogrammed with the sensors new locations. Depending on the vehicle manufacturer, reprogramming a vehicle TPM sensors can be performed automatically when a vehicle is driven, performing some functions such as pushing a reprogramming button inside the vehicle, using the vehicle key fob, performed at a service station by a service technician using a special reprogramming tool, etc.

SUMMARY OF THE INVENTION

According to one embodiment of the invention, there is provided a method for detecting and responding to a potential tire theft. The method includes the steps of detecting that a tire is missing from a vehicle using a vehicle tire pressure monitoring system, and providing a notification of the missing tire via a wireless communication sent from a telematics unit on the vehicle. The wireless communication can be sent automatically by the telematics unit in response to the detection.

According to another embodiment of the invention, there is provided another method for detecting and responding to a potential tire theft. The method includes the steps of: (a) providing a vehicle having a tire pressure monitoring (TPM) system that includes a TPM sensor attached to each of a number of the vehicle's tires; (b) determining an operational status of the vehicle; (c) in response to the determined operational status, detecting that at least one of the vehicle tire's is missing based on a failure to receive expected data from at least one of the TPM sensors; and (d) sending a notification of the one or more missing tires.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below are directed to approaches for monitoring a missing vehicle tire and notifying a user of the vehicle about a potential tire theft. Although phrased in terms of "tire theft," "missing tire," or the like, it will be appreciated that the removal of a tire from a vehicle, particularly when being stolen, in almost all cases involves removal and theft of the entire wheel assembly; that is, both the rim and the tire mounted on the rim. Thus, it will be understood that by detecting a missing tire, the disclosed methods will generally also be able to detect a potential theft of the entire wheel. To detect a missing tire (and thus, wheel), the disclosed methods involve monitoring a vehicle's tires via a vehicle tire pressure monitoring (TPM) system. Therefore, the system determines if a TPM sensor which is located inside a vehicle tire is missing. If so, then the system interprets the missing TPM sensor as a missing tire. This approach allows the system to notify a user of the vehicle in a timely fashion via the vehicle telematics unit of a potential tire theft.

Communications System—

Figure 1:
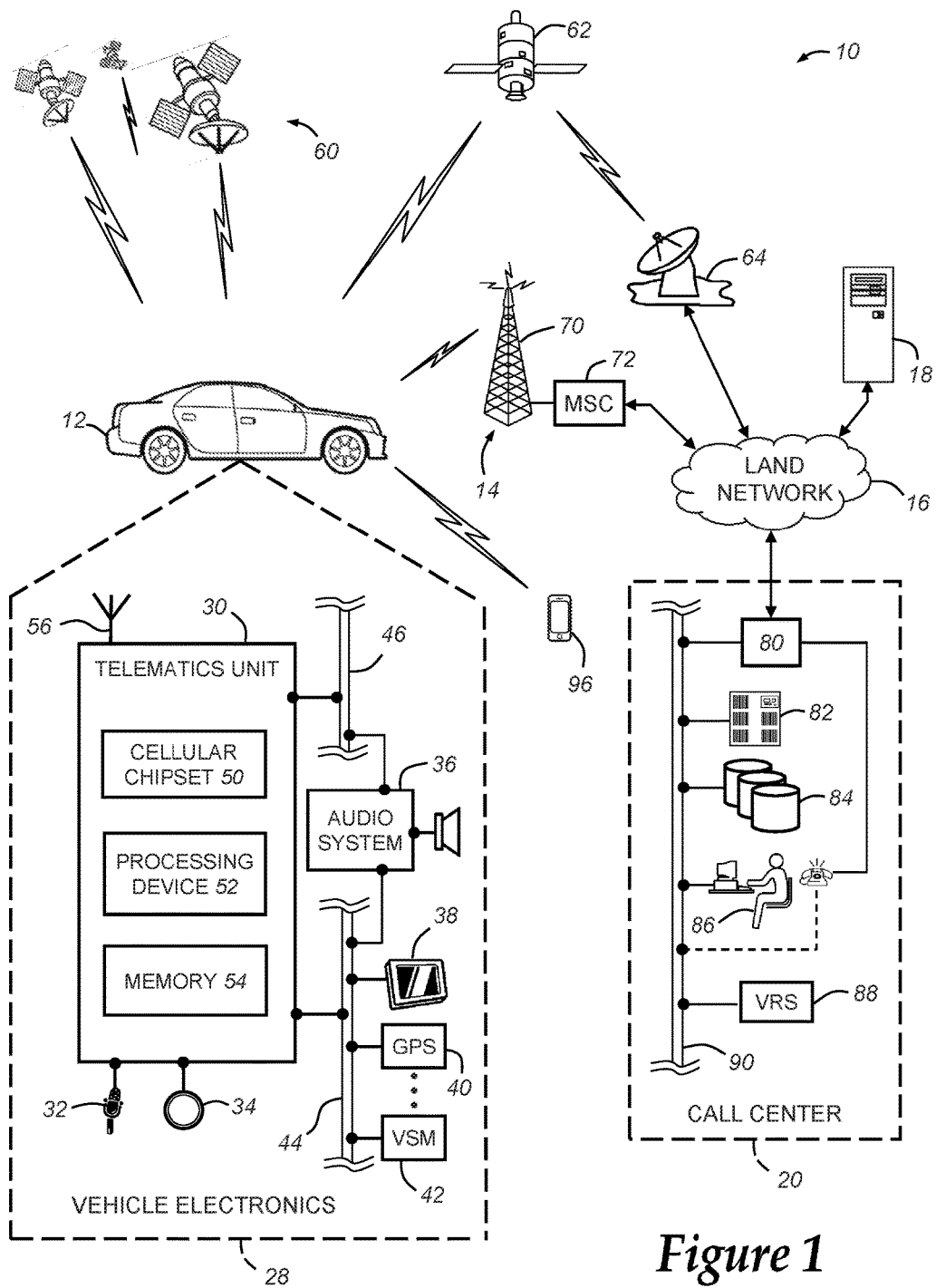
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other wheeled vehicle including motorcycles, trucks, sports utility vehicles (SUVs), recreational vehicles (RVs), aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible. As will be described in greater detail below, in some embodiments VSM 42 can be a transceiver or other centralized portion of a tire pressure monitoring (TPM) system that utilizes tire pressure sensors to monitor tire pressure of each of the vehicle wheels. The construction and use of that TPM system will be described in greater detail below.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
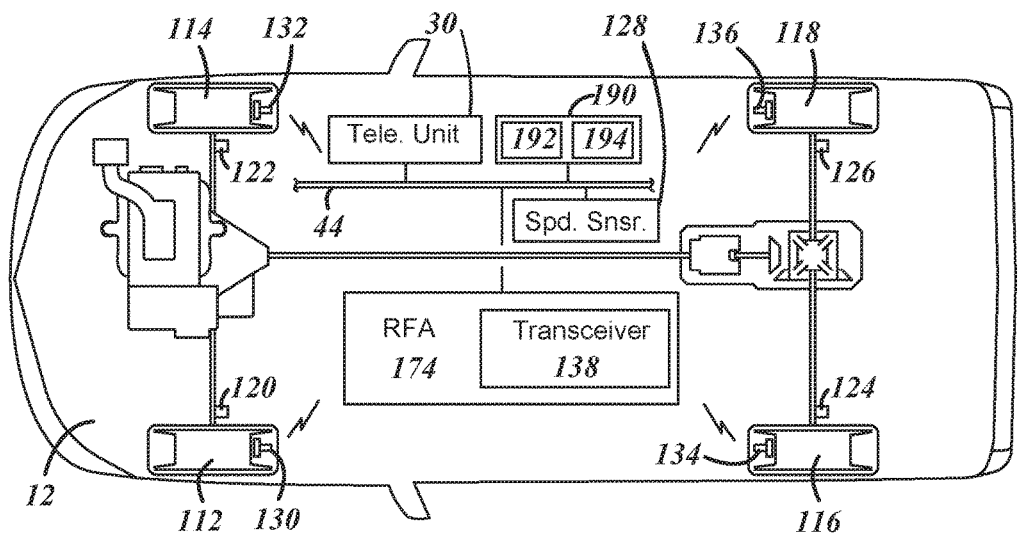
FIG. 2 is a schematic view of an exemplary tire monitoring system that includes a TPM system, an alert system, and a telematics unit.
Figure 3:
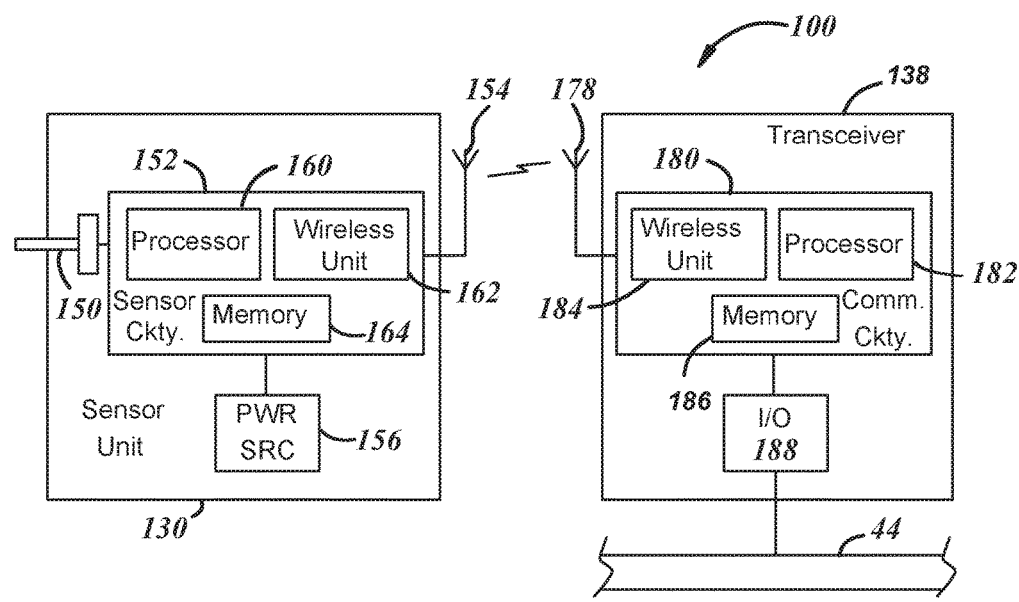
FIG. 3 is a more detailed schematic view of the exemplary TPM system of FIG. 2 where, for purposes of illustration, only a single sensor unit and a wireless module are shown.

Turning now to FIGS. 2 and 3, there is shown an exemplary tire monitoring system 100 that includes a tire pressure monitoring (TPM) system 110. Although the following description is in the context of a particular TPM system 110, it should be appreciated that this system is merely exemplary and that other TPM systems known in the art could also be used. According to this embodiment, tire monitoring system 100 includes wheel speed sensors 120-126, vehicle speed sensor 128, sensor units 130-136, a transceiver unit 138 and an alert system 190.

Wheel speed sensors 120-126 provide vehicle 12 with wheel speed signals that include information relating to the speed, acceleration, and/or general state of the wheels. According to one embodiment, individual speed sensors are coupled to each of the vehicle's four wheels and separately report the rotational velocity of the four wheels. Wheel speed sensors 120-126 may include electromagnetic elements, optical elements, or any other technology known in the art.

Vehicle speed sensor 128 provides vehicle 12 with a vehicle speed signal that is generally representative of the speed or velocity of the vehicle. A variety of different vehicle speed sensors and sensing techniques may be used, including those that use wheel speed, ground speed, accelerator pedal position, clutch pedal position, gear shifter selection, vehicle acceleration, engine speed, engine torque, and throttle valve position, to name but a few. In one embodiment, vehicle speed sensor 128 derives or calculates a vehicle speed signal from the wheel speed signals described above (in this case, it may be possible to integrate or combine vehicle speed sensor 128 with one or more of the wheel speed sensors 120-126). In another embodiment, vehicle speed sensor 128 determines the speed of the vehicle relative to ground by directing radar, laser or other signals towards the ground and analyzing the reflected signals. In another embodiment, vehicle speed sensor 128 is coupled to certain parts of the vehicle and determines the vehicle speed accordingly. For example, a vehicle speed sensor can be coupled to an output shaft of the transmission or behind the speedometer or even individual wheel speed sensors 120-126, as mentioned above. Vehicle speed sensor 128 may include electromagnetic elements, optical elements, or any other technology known in the art. It is also possible for the vehicle speed signal to be provided to vehicle 12 by another component, module and/or system in the vehicle, such as an engine control module (ECM).

Sensor units 130-136 are respectively mounted at vehicle wheels 112-118 and are designed to take one or more types of readings, such as tire pressure readings, and wirelessly communicate those readings to transceiver unit 138, which is mounted on the vehicle. In one embodiment, each of the sensor units 130-136 establishes a wireless link with transceiver unit 138 that enables two-way communication between the wheel-mounted sensor unit and the vehicle-mounted transceiver unit. It should be appreciated that it is not necessary to establish a bi-directional wireless link between these components, as some instances may only require a one-way communication link, as is known in the art. Each sensor unit 130-136 may be used to replace a traditional rubber valve stem and, in an exemplary embodiment, includes a sensing element 150, sensor circuitry 152, an antenna 154, and a power source 156. It should be appreciated that any number of additional components, devices, circuits, etc. that are known in the art could also be used. The following description is provided in the context of sensor unit 130, but can apply to sensor units 132-136 as well.

Sensing element 150 measures tire pressure and generates readings that can be processed, saved, analyzed and/or transmitted by sensor unit 130. Sensing element 150 may be of the type that is in direct communication with the air inside of the tires (a so-called direct TPM system), or of the type that does not directly sense the air pressure within the tire but instead determines it based on one or more additional parameters, like wheel rotational speed (a so-called indirect TPM system). In the case of a direct TPM system, a variety of suitable mounting configurations could be used. These include mounting sensing element 150 in the end of a valve stem or mounting it in a steel band that extends around the rim of the wheels, to name a few. In one particular embodiment, sensing element 150 may be made in a glass-silicon-glass structure that holds a pressure sensitive membrane with one or more piezo resistive elements buried therein. An absolute pressure reference can be given by a vacuum chamber implemented in the top glass, for example. It should be appreciated that sensing element 150 may also sense temperature, displacement, velocity, acceleration or any other suitable parameter, and is not limited to tire pressure sensing only.

Sensor circuitry 152 receives input from sensing element 150 and may engage in a communication with transceiver unit 138, which is located at vehicle 20. According to the particular embodiment shown here, sensor circuitry 152 is electronically connected to sensing element 150 and antenna 154 and includes a processing unit 160, a wireless unit 162, and memory 164. With these components, sensor circuitry 152 may establish a wireless link with transceiver unit 138 so that a communication can occur between them; as mentioned above.

Processing unit 160 can process information from a number of different sources and preferably includes one or more suitable components, such as a microprocessor, a microcontroller, an application specific integrated circuit (ASIC), or any other suitable device known in the art. Processing unit 160 may be assigned a variety of tasks, including packaging sensor readings from sensing element 150 into a suitable data format that can be provided to wireless unit 162 for subsequent wireless transmission. These are only some of the tasks and functions that processing unit 160 may perform, as skilled artisans will appreciate that it could be used in many other capacities as well.

Wireless unit 162 may perform a number of tasks pertaining to the transmission and/or reception of wireless signals between the wheel-based sensor unit 130 and the vehicle-based transceiver unit 138. For instance, wireless unit 162 may receive a data packet containing sensor readings from processing unit 160, modulate the data packet information onto a particular carrier frequency, up-convert the modulated signal to an appropriate radio frequency, and broadcast the resultant RF signal to transceiver unit 138.

Memory 164 may store various pieces of data, information, wireless settings, software, firmware, etc., and can be accessed by the different components of TPM system 110. In one example, memory 164 stores readings taken by sensing element 150, electronic instructions used to control processing unit 160, etc. These are, of course, only some of the items that could be stored at memory 164, as skilled artisans will know of many other potential uses.

Antenna 154 is electronically coupled to sensor circuitry 152, particularly wireless unit 162, and aids in the transmission and reception of wireless signals. In one exemplary embodiment, antenna 154 is an RF antenna and is integrated into a valve stem that functions as both an air valve for the tire and as an antenna for transmitting and receiving encoded RF information. Depending on where the vehicle is likely to be used, antenna 154 may transmit and receive signals over ultra high frequency (UHF) signals, which are part of the RF range (e.g., 315 MHz in the United States and 433 MHz in Europe). Other embodiments of antenna 154 could also be used.

Power source 156 powers the components of sensor unit 130 and may include any suitable power source known in the art. In an exemplary embodiment, power source 156 includes a non-replaceable battery with an expected lifetime of around ten years. Because of the finite lifetime of such a power source, efforts may be made to save battery consumption and prolong its life. In another embodiment, power source 156 is a passive device that derives its energy from wireless transmissions sent to the sensor unit; energy associated with the wireless transmissions is harnessed and stored by power source 156. The preceding examples are only two exemplary possibilities that could be used, as others are certainly possible.

Transceiver unit 138 is located on vehicle 12 and may be electronically connected to any number of different vehicle electronic modules, such as module 30, and wirelessly connected to sensor units 130-136. For example, transceiver unit 138 can be a VSM 42 connected to the communication bus 44 such that it can communicate with telematics unit 30 or other vehicle systems via the communication protocols used by bus 44. Alternatively, it could be connected directly or wirelessly to the telematics unit 30 or could be incorporated therein. According to one exemplary embodiment, transceiver unit 138 includes an RF transceiver and a signal processing subsystem or module for communicating with sensor units 130-136 over the wireless link mentioned above. Other wireless communication techniques could also be used to facilitate wireless communication between these components. Transceiver unit 138 may be integrated or combined with another device in the vehicle, such as a remote function actuator (RFA) 174, it may be a standalone module, or it may be implemented according to some other arrangement known in the art, for example. RFAs can be used for remote keyless entry (RKE) and vehicle theft deterrent (VTD) systems. It should be appreciated that transceiver unit 138 may include any combination of electronic components and devices known in the art, including an antenna 178, an exemplary communications circuitry 180 having a processing unit 182, a wireless unit 184, and memory 186. Components 182-186 could be similar to those described in conjunction with sensor unit 130, or they could be different in order to accommodate the needs of a vehicle-mounted module. Transceiver unit 138 may also have an I/O device 188 for connecting the transceiver unit to a vehicle bus 44 or other vehicle communications network, as well as other components like a fully integrated voltage controlled oscillator (VCO), an intermediate frequency (IF) filter, a phase-locked loop (PLL) circuit, a demodulator, a loop filter, etc.

It should be appreciated that the general operation of a TPM system is known in the art. Thus, a recitation of the known general operation is not provided here. TPM system 110 may be used with any number of wheel-mounted sensor units 130-136, and is not limited to use with four sensor units only. For instance, the TPM system could interact with one, two or three sensor units, or it could interact with more than four sensor units, such as the case of a tractor trailer or the like. In some cases, TPM systems use a low frequency wireless signal (e.g., 125 KHz) to program the wheel-mounted sensor units when the vehicle is being manufactured and before it has left the manufacturing facility. This type of communication typically takes place between a piece of electronic equipment at the manufacturing facility and the sensor units.

Alert system 190 performs or issues alerts that are meant to notify a vehicle owner of different types of situations. According to one exemplary embodiment, alert system 190 includes a theft deterrent system 192 which may be part of the vehicle's standard anti-theft alarm system, and a notification system 194 which may be part of the vehicle's telematics or other wireless communications system. By utilizing existing systems already provided with the vehicle, the present method may not require significant amounts of additional hardware. Alert system 190 may receive signals from VSM 42 over connection 44 where the signals instruct the alert system to perform one or more types of alerts, including theft alerts with theft deterrent system 192 and/or alerts with notification system 194, as will be explained. Theft deterrent system 190 uses visual, audible or other types of alerts or notifications and may include any combination of suitable hardware and/or software components. This may include, for example, honking a horn or sounding a siren, flashing various exterior lights, or activating any other components that are commonly part of a vehicle anti-theft system. Notification system 194, on the other hand, sends or issues wireless alerts, notifications, messages, etc., and may include any combination of suitable hardware and/or software components needed to do so. For instance, notification system 194 may make phone calls or send wireless text messages, emails, etc. in an effort to notify a vehicle owner or other designated party of a potential theft of one or more wheels 112-118. Skilled artisans should appreciate that other embodiments are also possible, as alert system 190 is not limited to any specific or particular embodiment.

Method—

Figure 4:
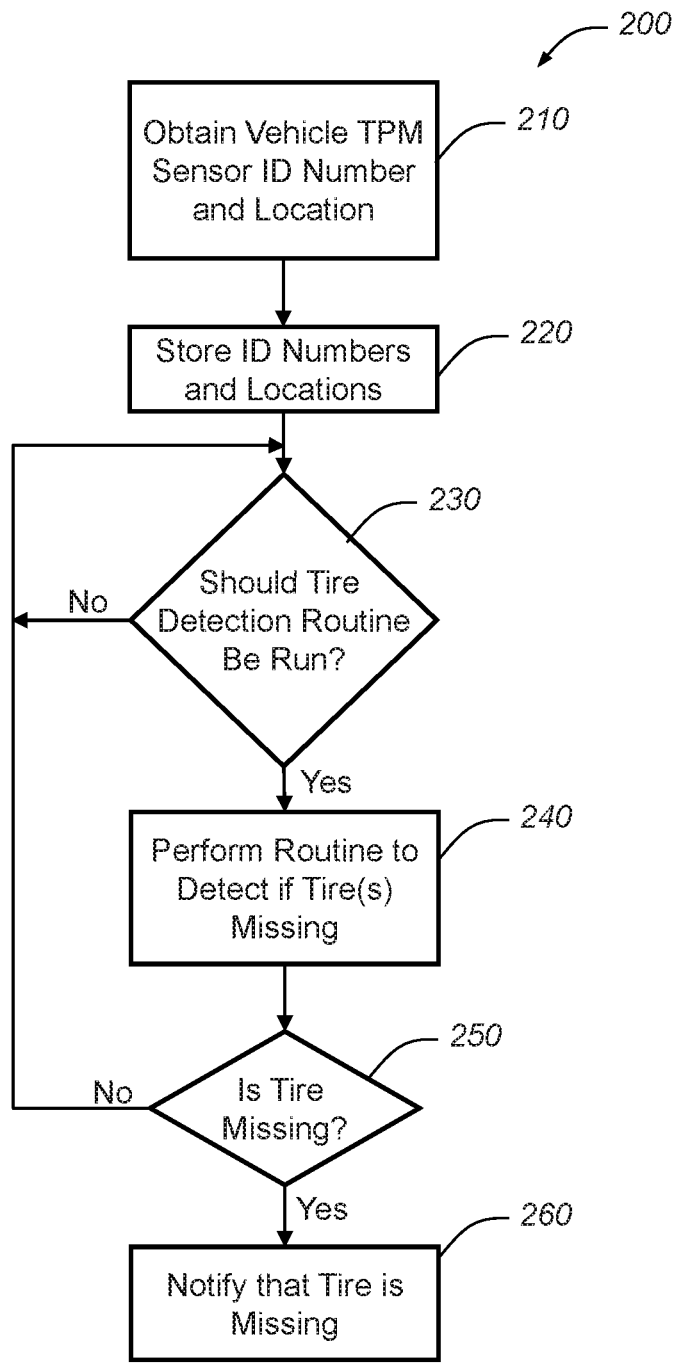
FIG. 4 is a flowchart illustrating some of the steps of an exemplary method for detecting and responding to a potential tire theft.

Turning now to FIG. 4, there is shown a method 200 that detects a missing vehicle tire and notifies a user of the vehicle about a potential vehicle tire theft via a vehicle telematics unit. The method starts at step 210 and begins by obtaining a vehicle TPM sensor identification number and location. There are a variety of techniques that method 200 can employ to obtain the vehicle TPM sensor identification number and location. In one embodiment, one TPM sensor identification number and corresponding location for each wheel 112-118 is obtained and later programmed into vehicle 12 during its assembly at a manufacturing facility. In another embodiment, a service technician obtains sensor units 130-136 identification numbers using a handheld device or any other suitable device and later programs the obtained identification numbers with corresponding locations into vehicle 12. In a third embodiment, a user of vehicle 12 obtains and/or programs sensor units 130-136 identification numbers via a pushbutton 34, visual display 38 and/or any other VSM 42. Skilled will recognize other techniques to obtain vehicle 12 TPM sensor units identification numbers and corresponding locations. This step 210 can be carried out as a part of the original manufacturing of the vehicle 12, or can be done at some later time.

At step 220, method 200 stores the identification numbers and corresponding locations. In one embodiment, memory 186 stores the identification numbers for sensor units 130-136 and their corresponding locations (e.g., front left (FL), front right (FR), rear left (RL), and rear right (RR)). In another embodiment, telematics memory 54 stores the identification numbers and, optionally, their corresponding locations, or they can be stored at both locations such that those stored in memory 54 are used in the missing tire detection method of FIG. 4 whereas those stored in memory 200 are used for tire pressure monitoring. Skilled artisans will appreciate that other storage means can be employed.

At step 230, method 200 checks to determine if the tire detection portion of the method 200 should be run. This determination can be carried out in any suitable manner. For example, time-triggered checks can be used to periodically check for a missing tire, which can be done at regular or random intervals which could be on the order of seconds, or more or less often than this. In another example, the tire detection process can be based on the operational status of the vehicle; for example, partially or entirely on vehicle speed or ignition status. This can be done to first determine that the vehicle is not being driven since tire theft is not known to occur while the vehicle is moving. Thus, the tire detection process can be run once or periodically whenever the vehicle ignition is off, or can use sensed vehicle speed so that, for example, the tire detection process is not done when the vehicle is moving, but is done repeatedly while the vehicle is stopped, whether the ignition is on or off. Skilled artisans will recognize other means or triggers that can be used to initiate the tire detection process. For example, step 230 may initiate the tire detection process in response to an arming signal for a vehicle alarm system so that the tire detection is continuously or repeatedly carried out whenever the vehicle alarm is set. Or, a combination of triggers or conditions can be used (e.g., either ignition off or zero vehicle speed in combination with a vehicle motion detector that may be a part of a vehicle alarm system that detects tilting, lifting or other contact with the vehicle. In other embodiments, the tire detection process can run anytime the TPM system is not actively monitoring tire pressure. And in yet other embodiments, the check at step 230 need not be used at all, with the method continuously monitoring the tire sensors 130-136 to detect a missing tire. Where step 230 uses vehicle speed to determine whether or not to run the tire detection process, wheel speed sensors 120-126 can be used to provide the speed of vehicle 12 wheels and therefore the speed of vehicle 12. In another embodiment, vehicle speed sensor 128 is used to obtain the speed of vehicle 12. Other embodiments are also possible, for example, method 200 may send an inquiry signal to VSM 42 such as an engine control module, powertrain module, or any other applicable module to inquire about vehicle 12 speed. One purpose of checking vehicle 12 speed for those embodiments that use it at step 230, rather than merely whether the vehicle engine is off is that the engine can be running and yet the vehicle not moving. For example, vehicle 12 engine can be running for warm up purposes, conditioning vehicle cabin, or any other reasons. Hence, although the vehicle ignition is on, there is still the opportunity for removing one or more wheels 112-118 and therefore it may be desirable to monitor for a missing tire even though the vehicle ignition and engine are on.

If it is determined at step 230 that tire detection is not needed (e.g., the vehicle is moving), then the process can loop back to the beginning of this step 230 such that it continuously or repeatedly checks for changed conditions until tire detection is desired. Once it is determined that the tire detection process should be commenced (e.g., based on the operational status of the vehicle), the method moves to step 240 where the process performs a routine that can detect that one or more of the vehicle tire's are missing based on a failure to receive expected data from at least one of the TPM sensors. Thus, for example, if any of the sensor units 130-136 do not report their identification numbers or do not report tire pressure data, this missing information can be used to determine that the sensor and its corresponding tire are missing. In one embodiment, this process can be done by sending a request command to obtain the identification numbers for sensor units 130-136. For this purpose, processor 52 can send a request command to transceiver unit 138 requesting sensor units 130-136 identification numbers. In a different embodiment, a different VSM 42 such as a vehicle alarm system requests the identification numbers for sensor units 130-136 from transceiver 138. Or, this functionality can be built into the TPM system 110 itself Skilled artisans should appreciate that a conventional TPM system is generally reading sensor units 130-136 identification numbers only when vehicle 12 reaches a certain speed. However, step 240 is used to obtain the sensor readings and/or identification numbers at other times (e.g., when the vehicle is not moving) as determined by the check at step 230.

At step 250, method 200 determines if one or more valid identification numbers are returned in response to the command send in step 240. That is, the system attempts to obtain the identification numbers from all of the TPM sensors and compare them to the stored identification numbers. In one embodiment, processor 52 receives one identification number at a time and compares it to the stored identification numbers. If the identification number matches one of the stored ones then it is validated as a valid identification number. This helps prevent accidentally reading a sensor from a nearby different vehicle. Method 200 keeps performing this task until all four identification numbers are received and validated as valid identification numbers. In another embodiment, all four identification numbers are received and processed by processor 52 as a group. If an identification number is received but it is invalid then, in one embodiment, method 200 may optionally retry receiving the missing identification number again. Method 200 may retry a specific number of trial (e.g., 3) or may retry for a specific time limit (e.g., few seconds). If the identifications numbers for all tires are validated, then the detection method is successful and the process returns to step 230 to determine if the tire detection process should be repeated.

Apart from that described above, there are various approaches that can be used with the sensors 130-136 to detect a missing tire. For example, the failure to detect a valid identification number for each sensor can be used as an indicator of a missing tire, as discussed above. Alternatively, rather than storing and using identification numbers for the sensors, the failure to receive a pressure reading or other communication from any one of the sensors can be taken as an indicator of a missing tire. Thus, even if identification numbers were not used, the fact that only three pressure readings or other communications from the sensors are received, when the vehicle was equipped originally with four tires and four corresponding sensors, is an indication that one of the tires and its sensor is missing. Also, even where identification numbers are used, the numbers themselves need not necessarily be validated, but merely the fact that there are four reported can be used to confirm that all tires are present. Also, where the sensors are each associated with a particular wheel location and that information is stored in one of the memories 54, 200, then upon determining that a particular sensor unit is missing (e.g., based on its identification number) the system can identify which vehicle wheel is missing and include that identification of wheel location when it notifies the vehicle owner or other interested party of the missing tire. This determination that a tire is missing can be carried out by the telematics unit 30, TPM system 110, theft alert system 190, or by some other VSM 42 or other circuitry in the vehicle.

Where step 250 determines that a tire is missing based on missing or invalid data from sensors 130-136, the process moves to step 260 to provide notification and alerting of this missing tire. This can include any one or more of the following steps: an audible or visual alert at the vehicle (e.g., via flashing exterior vehicle lights and an alarm siren); notification to a call center via the telematics unit 30; and/or notification to the vehicle owner other interested party (e.g., vehicle fleet operator, police, or other person associated with the vehicle). In one embodiment, the missing tire detection occurs at the telematics unit 30 itself which is programmed to then automatically place a cellular phone call to the call center 20. This can be a data call that is automatically sent in response to the detection of the missing tire so that the operator need not be present and no user intervention is required. Where the missing tire detection occurs at another VSM, such as TPM system 110 or theft alert system 190, a signal can be sent to the telematics unit to cause it to automatically place the notification call to the call center. For example, theft alert system 190, in response to detecting a missing tire or receiving a signal indicating that a missing tire has been detected, can trigger a request to its notification system 194 to place a phone call to call center 20 via vehicle telematics unit 30.

Instead of sending a message to call center 20, the vehicle owner or other interested party can be notified directly, or this can be done from the call center after it receives notification of the potential tire theft from the vehicle. This reporting to the vehicle owner or other interested party can be done via an electronic communication (e.g., phone call, text message, email). The message can be a prerecorded message stored in memory 54 informing the recipient about a potential tire theft possibly with instructions to call call center 20 for more information. Skilled artisans should appreciate that other forms of an electronic communication may be provided by telematics unit 30 such as a text message, email, and/or others instead or in addition of a phone call. In some embodiments, the message can also include information obtained from the tire detection process, such as which vehicle wheel location is missing the tire. GPS data from module 40 can also be included to identify the geographic location of the vehicle. In an additional embodiment, vehicle 12 may inform a public authority (e.g., police) about a potential vehicle tire theft and the location of vehicle 12 via a phone call from telematics unit 30 or call center 20. As noted above, the detection of a missing tire can also be used to send a signal to an alarm system such as theft deterrent system 192 which will trigger performing an audible and/or visual alert by the vehicle alarm system. This may include, for example, honking a horn or sounding a siren, flashing various exterior lights, or activating any other components that are commonly part of a vehicle anti-theft system.

As noted above, the method 200 can be carried out by suitable programming of the telematics unit 30, TPMS system 110, and/or other VSMs 42 using known hardware and software techniques, all of which is within the level of skill in the art.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for detecting and responding to a potential tire theft, comprising the steps of:
   (a) receiving an identification number corresponding to a sensor unit associated with a vehicle tire and comparing the received identification number to one or more stored identification numbers corresponding to one or more known sensor units associated with one or more tires of a particular vehicle;
   (b) detecting that the received identification number does not correspond to a known sensor unit of the vehicle and that a tire is missing from the vehicle when the received identification number does not match at least one of the one or more stored identification numbers to which it was compared; wherein the received identification number corresponds to a sensor unit not associated with the particular vehicle; and
   (c) providing a notification of the missing tire via a wireless communication sent from a telematics unit on the vehicle, wherein wireless communication is sent automatically by the telematics unit in response to the detection.

2. The method of claim 1, further comprising, in response to step (b), the step of performing an audible and/or visual alert at the vehicle.

3. The method of claim 1, wherein the sensor unit comprises a tire pressure sensor attached to the tire, and step (a) further comprises receiving the identification number corresponding to the tire pressure sensor.

4. The method of claim 1, further comprising the step of determining that the vehicle is not being driven and carrying out steps (a) and (b) in response to the determination.

5. The method of claim 1, wherein step (c) further comprises notifying a call center about the missing tire via the wireless communication.

6. The method of claim 5, further comprising the step of reporting the missing tire to an owner of the vehicle or other interested party in response to the communication received by the call center.

7. The method of claim 1, wherein step (c) further comprises notifying an owner of the vehicle or other interested party via the wireless communication from the telematics unit.

8. The method of claim 1, further comprising the step of obtaining the vehicle's location from the vehicle and reporting the missing tire and vehicle location to a police authority.

9. A method for detecting and responding to a potential tire theft, comprising the steps of:
  (a) providing a vehicle having a TPM system that includes a TPM sensor attached to each of a number of the vehicle's tires, each TPM sensor having a respective identification number corresponding thereto;
  (b) determining an operational status of the vehicle;
  (c) in response to the determined operational status, receiving a plurality of identification numbers, comparing each received identification number to one or more stored identification numbers corresponding to the TPM sensors of the vehicle, and detecting that at least one of the received identification numbers does not correspond to any of the TPM sensors of the vehicle and that at least one of the vehicle's tires is missing based on a failure of at least one of the received identification numbers to match at least one of the stored identification numbers; wherein the at least one of the received identification number corresponds to a TPM sensor not associated with the vehicle; and
  (d) sending a notification of the one or more missing tires.

10. The method of claim 9, wherein step (b) further comprises determining the vehicle speed and wherein steps (c) and (d) are carried out if the speed is zero.

11. The method of claim 9, wherein step (c) is carried out by the TPM system.

12. The method of claim 9, wherein step (c) is carried out by a vehicle system module that obtains TPM sensor information from the TPM system.

13. The method of claim 9, wherein step (d) further comprises automatically sending a notification from a telematics unit of the vehicle in response to the detection of the one or more missing tires.

14. The method of claim 9, wherein step (d) further comprises the steps of:
  sending a signal to a vehicle alert system which triggers a request to send a potential tire theft notification via a vehicle telematics unit; and sending the notification from the vehicle telematics unit to a vehicle owner or other interested party in response to the request.

15. The method of claim 9, wherein step (d) further comprises the steps of:
  sending a signal to a vehicle alert system which triggers a request to send a potential tire theft notification via a vehicle telematics unit; and sending the notification from the vehicle telematics unit to a call center; and then reporting the potential tire theft to a vehicle owner or other interested party via a communication from the call center.

16. The method of claim 9, further comprising, in response to step (c), the step of performing an audible and/or visual alert at the vehicle.

* * * * *